UNITED STATES PATENT OFFICE.

DANIEL C. ROBERTS, OF TRENTON, NEW JERSEY.

INNER-TUBE SUBSTITUTE.

1,295,604.  Specification of Letters Patent.  Patented Feb. 25, 1919.

Application filed October 8, 1917. Serial No. 195,380.

*To all whom it may concern:*

Be it known that I, DANIEL C. ROBERTS, a citizen of the United States, residing at Trenton, in the county of Mercer and State of New Jersey, have invented certain new and useful Improvements in Inner-Tube Substitutes, of which the following is a specification.

This invention has relation to pneumatic tires for vehicle wheels, and has for an object to provide a liner for insertion in the casing of a pneumatic tire to permit the same to hold air and to thereby obviate the use of an inner tube.

Another object of the invention is to provide a device for the purpose above described adapted also to insure retention of the tire casing upon the rim.

In furtherance of the foregoing my invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:—

Figure 1:
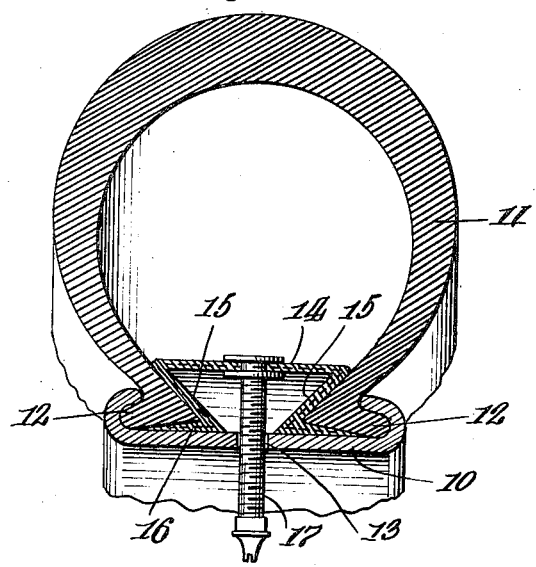
Figure 2:
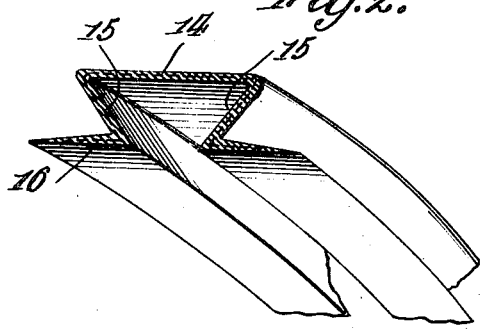

Figure 1, is a view in transverse section of a pneumatic tire of the clencher type illustrating the association therewith of my invention, and Fig. 2, is a sectional detail view in perspective illustrating the device of my invention *per se*.

With reference to the drawings, 10 indicates a typical clencher rim having inturned edges and 11 indicates a tire casing having beads 12 which are engaged within the inturned marginal edges of the clencher rim, said clencher rim having an opening 13 for the introduction of the air valve.

My invention comprises a circular device, to be formed wholly or partly of rubber and reinforced with canvas after the manner of the structure of the tire casing, to provide at the same time flexibility and durability. The device comprises a body portion 14 and side walls 15 which are directed toward each other, each wall 15 having upon its edge a flange 16, which flanges taper toward the edges thereof and extend in opposite directions. An opening is provided in the body portion 14 of the device to receive the valve stem indicated at 17 which valve stem is adapted to extend through the opening 13 of the clencher rim when the device is in place.

In use, one of the flanges 16 is cemented or otherwise secured to one of the beads, and the body portion 14 of the device as well as the side walls 15 thereof are inclosed in the casing, the other flange 16 of the device engaging the opposite bead of the tire casing. The device and tire casing is then placed in the clencher rim in the manner shown in Fig. 1, so as to permit the inner surfaces of the flanges 16 to engage or contact with the outer surface of the clencher rim. The valve stem is then connected to a pump or other source of air supply, and the rise in pressure of the air within the tire casing forces the body portion 14 radially inward on the wheel. Because of the convergence of the sides of the casing, this forces the walls 15 of the device apart and causes the same to snugly engage the casing, preventing the escape of air from the tire casing and thereby permitting the same to retain the air therewithin without the use of an inner tube. If desired both of the flanges 16 may be cemented to the beads.

It will thus be apparent that the device will not only serve to permit the tire casing to hold air without the use of an inner tube, but will also act to force the beads of the tire casing firmly into the inturned edges of the clencher rim to secure the tire casing in place. The device will act equally well when used in connection with a tire casing of the clencher, or of the demountable type. It will also be apparent that since the device itself is not subject to wear it will outlast the tire casing itself and hence may be used in connection with other tire casings when the original casing is no longer available. The tire casing may furthermore be repaired without removing the same from the rim. Other uses and advantages of my invention will be readily apparent to those skilled in the art to which this invention appertains.

While I have illustrated and described my invention with some degree of particularity, I realize that in practice various alterations thereover may be made and I therefore desire to reserve the right and privilege of changing the form of the details of construction or otherwise altering the arrangement of the correlative parts without departing from the spirit of the invention or the scope of the appended claims.

Having thus described my invention what I claim as new and desire to secure by Letters Patent is:—

1. In combination with a tire casing and rim, an annular member of flexible material arched transversely between its edges, the same having a pair of oppositely extending marginal flanges to engage the inner sides of the beads of the tire casing, and a valve associated with said annular member to permit the casing to be inflated, the annular member collapsing and engaging the beads of the casing to preclude the escape of air therefrom.

2. A flexible liner for tire casings comprising a body, side walls converging from the edges thereof, and flanges projecting laterally outward from the inner edges of the walls and tapering outward, for the purpose set forth.

3. A device for association with a pneumatic tire casing including an annular member of flexible material, having oppositely extending flanges at its edges, for the purpose described.

4. A device for association with a pneumatic tire casing including an annular member of flexible material, a pair of oppositely directed flanges on the marginal edges of the member, and a valve associated with said annular member for the purpose described.

In testimony whereof I affix my signature in presence of two witnesses.

DANIEL C. ROBERTS.

Witnesses:
WM. ZEAMAN,
M. E. JONES.